United States Patent Office 2,912,461
Patented Nov. 10, 1959

2,912,461
PROCESS OF PREPARING 2-ACYL-1-PHENYL-HYDRAZIDES

Thomas S. Donovan, Rochester, N.Y., assignor to Eastman Kodak Company, Rochester, N.Y., a corporation of New Jersey No Drawing. Application August 14, 1957
Serial No. 678,038

4 Claims. (Cl. 260—562)

This invention relates to an improved process of preparing 2-acyl-1-phenylhydrazides, from phenyl hydrazine and an ester of the acid corresponding to the acyl group, according to the reaction represented by the equation:

$C_6H_5.HN.NH_2 + R.CO.OR' \rightarrow R.CO.NH.NH.C_6H_5 + R'OH$

While this reaction has been known, it has proceeded only with difficulty, and in most cases not at all. Whereit has been found to proceed, special conditions have had to be set up, as for example in the work of Jones, Halter and Myers, reported in J. Am. Chem. Soc. 75, 6055 (1953). These authors found that phenylhydrazides could be prepared by refluxing esters with a 400% excess of phenylhydrazine in the presence of water and phosphoric acid. Yields up to 60% were obtainable in this fashion.

I have discovered that 2-acyl-1-phenylhydrazides can be readily prepared in good yield by the reaction of esters of the acid corresponding to the acyl group and phenylhydrazine in the presence of sodium methylate or sodium ethylate. Use of a large excess of either reactant is not necessary.

By way of illustrating my invention, I give the following examples:

*Example 1.—Preparation of 2-acetyl-1-phenylhydrazide,*
$CH_3.CO.NH.NH.C_6H_5$

To a solution of 12 g. of sodium in 250 ml. of methanol were added 46 ml. of ethyl acetate and 52 ml. of 95% phenylhydrazine. The solution was refluxed on the steam bath for 4 hours, and the solvent removed by distillation, a thick yellowish sirup remaining. This was poured into 400 ml. of water, and the aqueous solution was neutralized with dilute hydrochloric acid. Immediate crystallization of white platelets took place. The mixture was cooled to 10° C., and the crystals filtered off, washed with cold water and dried. The melting point of the product was 129–130° C. The yield of 2-acetyl-1-phenylhydrazide was 58 g., or 82.1% of theoretical.

*Example II.—Preparation of 2-hydroxypivalyl-1-phenylhydrazide,* $HO.CH_2.C(CH_3)_2.CO.NH.NH.C_6H_5$ To a solution of 6 g. of sodium in 150 ml. of anhydrous ethanol were added 34.3 g. of methyl hydroxypivalate and 27 g. of phenylhydrazine. The solution was refluxed overnight on the steam bath, and the solvent was removed by distillation, a solid white residue remaining in the flask. This was washed out with 300 ml. of water, and the aqueous slurry was neutralized with dilute hydrochloric acid. For purification, the solid was redissolved by adding 3A denatured alcohol and heating to complete solution, then cooling to 10° C. The white crystals formed were filtered off, washed with 50% alcohol, and dried. The melting point of the product was 179–180° C. The yield of 2-hydroxypivalyl-1-phenylhydrazide was 41.1 g., or 79% of theoretical.

*Example III.—Preparation of 2-benzoyl-1-phenylhydrazide,* $C_6H_5.CO.NH.NH.C_6H_5$ Twelve grams of sodium were dissolved in 250 ml. of anhydrous alcohol, and to the solution were added 68 g. of methyl benzoate and 54 g. of phenylhydrazine. The semisolid mass which resulted was heated on the steam bath overnight, during which time most of the solid redissolved. The solution was diluted with alcohol to a volume of 800 cc., neutralized with dilute hydrochloric acid, and heated to boiling. The sodium chloride formed was filtered off, and the filtrate cooled to 10° C. White crystalline plates appeared, and were filtered off and dried. The melting point of the product was 171–172° C. The yield of 2-benzoyl-1-phenylhydrazide was 77 g., or 72.6% of theoretical.

*Example IV.—Preparation of 2-hydroxypivalyl-1-phenylhydrazide*

Twenty-five grams of sodium were dissolved in 400 ml. of anhydrous 3A denatured alcohol. To this solution were added 110 g. of phenylhydrazine and 174 g. of n-butyl hydroxypivalate. The resulting pale yellow solution was boiled under reflux for 18 hours, following which approximately one-half of the solvent was removed by distillation. The residual solution was poured, with good agitation, into 500 ml. of water containing 70 ml. of glacial acetic acid. Fine white plates precipitated immediately. After one hour of stirring, these were filtered off, washed with cold water, and dried. The melting point of the product was 179–180° C. The yield of 2-hydroxypivalyl-1-phenylhydrazide was 185 g., or 89% of theoretical.

*Example V.—Preparation of 2-hydroxypivalyl-1-phenylhydrazide*

Thirteen grams of sodium were dissolved in 250 ml. of anhydrous 3A denatured alcohol. To this solution were added 52 g. of phenylhydrazine and 102 g. of hydroxyneopentyl hydroxypivalate,

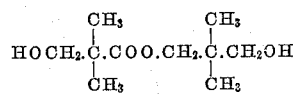

The resulting pale yellow solution was refluxed for 16 hours and poured, with stirring, into 600 ml. of cold water containing 36 ml. of glacial acetic acid. The heavy precipitate of white platelets was stirred for an additional hour, filtered off, washed on the filter with 50% aqueous alcohol, and dried. The product had a melting point of 178–180° C. The yield of 2-hydroxypivalyl-1-phenylhydrazide was 84.4 g., or 84.4% of theoretical.

2-acyl-1-phenylhydrazides prepared by the process of my invention are useful as intermediates in the preparation of substituted 3-pyrazolidones such as those described in U.S. Patent 2,772,282, which in turn are useful as photographic developing agents.

What I claim as my invention and desire to be secured by Letters Patent of the United States is:

1. A process of preparing 2-hydroxypivalyl-1-phenylhydrazide, which comprises heating phenylhydrazine, in the presence of a sodium alcoholate, with an approximately equimolecular amount of an ester of hydroxypivalic acid selected from the group consisting of methyl hydroxypivalate, n-butyl hydroxypivalate, and hydroxyneopentyl hydroxypivalate.

2. A process of preparing 2-hydroxypivalyl-1-phenylhydrazide, which comprises heating phenylhydrazine with an approximately equimolecular amount of methyl hydroxypivalate in the presence of a sodium alcoholate.

3. A process of preparing 2-hydroxypivalyl-1-phenylhydrazide, which comprises heating phenylhydrazine with an approximately equimolecular amount of n-butyl hydroxypivalate in the presence of a sodium alcoholate.

4. A process of preparing 2-hydroxypivalyl-1-phenylhydrazide, which comprises heating phenylhydrazine with an approximately equimolecular amount of hydroxyneopentyl hydroxypivalate in the presence of a sodium alcoholate.

References Cited in the file of this patent

UNITED STATES PATENTS

| | | |
|---|---|---|
| 2,524,422 | Boothe et al. | Oct. 3, 1950 |
| 2,689,852 | Fox | Sept. 21, 1954 |

FOREIGN PATENTS

| | | |
|---|---|---|
| 529,629 | Canada | Aug. 28, 1956 |

OTHER REFERENCES

Beilstein: Handbuch der Organischen Chemie, vol. XV, pp. 264–265.